(No Model.)

C. S. BRADLEY.
SECONDARY BATTERY.

No. 409,448. Patented Aug. 20, 1889.

Witnesses
Geo. W. Breck.
J. M. Blanchard

Inventor
Charles S. Bradley
By his Attorneys
Curtis & Crocker.

UNITED STATES PATENT OFFICE.

CHARLES S. BRADLEY, OF YONKERS, ASSIGNOR TO THE BRADLEY ELECTRIC POWER COMPANY, OF NEW YORK, N. Y.

SECONDARY BATTERY.

SPECIFICATION forming part of Letters Patent No. 409,448, dated August 20, 1889.

Application filed August 11, 1884. Serial No. 140,224. (No model.)

*To all whom it may concern:*

Be it known that I, CHARLES S. BRADLEY, a citizen of the United States, residing at Yonkers, in the county of Westchester and State of New York, have invented certain new and useful Improvements in Secondary Batteries, of which the following is a specification.

My invention relates to secondary or "storage" electric batteries; and it consists in employing in such batteries porous cells, plates, or diaphragms composed of some suitable material which is a conductor of electricity, to act while the battery is being charged merely as porous partitions to keep apart the fluids of the battery, and said plates while the battery is being discharged performing the double function of separating the fluids of the battery and forming also the negative electrodes of the battery.

My invention is applicable to various forms of secondary batteries; but it is especially designed to be applied to the battery which I myself invented, in which some haloid metallic salt—such as zinc bromide—is used as the electrolyte, said electrolyte being decomposed when the battery is charged, zinc being deposited upon one electrode and bromine set free upon the other, and said zinc and bromine recombining when the battery is discharged.

The above invention is fully described in Letters Patent No. 312,802, granted to me February 24, 1885.

The accompanying drawings illustrate my present invention as applied to the case of the invention referred to above.

Figure 1:
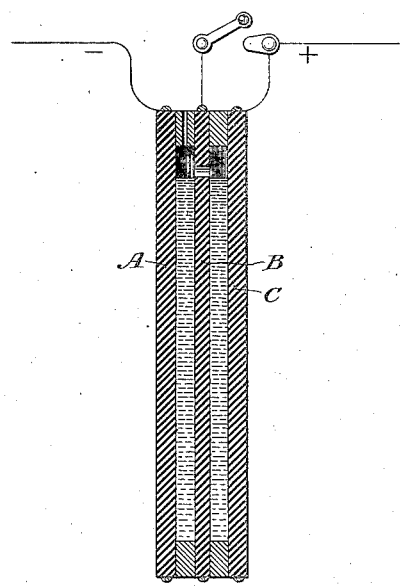
Figure 2:
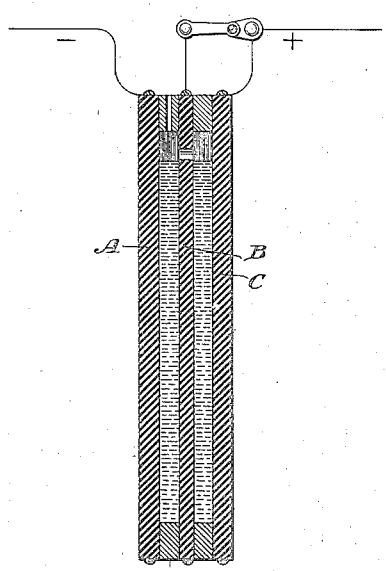
Figure 3:
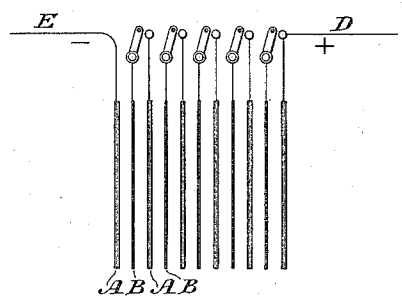
Figure 4:
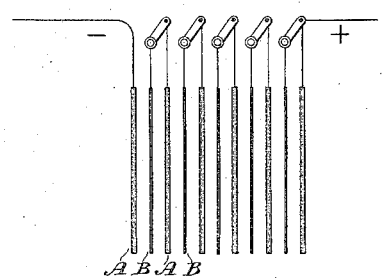
Figure 5:
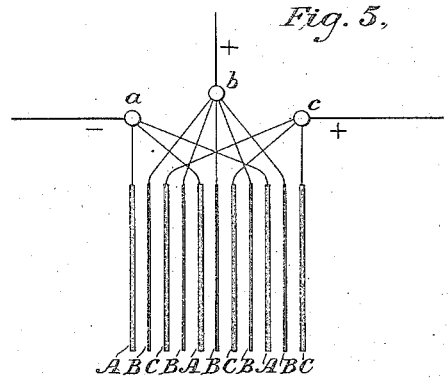

Figure 1 is a sectional view of a single cell constructed according to my invention, the electrical connections being arranged for charging. Fig. 2 is the same as Fig. 1, except that the connections are arranged for discharging the cell. Fig. 3 is a diagram showing the manner of arranging a number of cells in series to form a battery, the battery being connected for charging. Fig. 4 shows the same battery connected for discharging. Fig. 5 is a diagram representing a battery of cells connected together in multiple arc.

Similar letters of reference refer to similar parts in all the figures.

In Figs. 1 and 2, A B C are three plates composed of some suitable substance which is a conductor of electricity, the middle plate B being porous. I usually employ for the plate B a carbon plate similar to those commonly used in batteries, such a plate being porous enough for my purpose. For the plates A and C, I generally use carbon plates also; but I fill the pores of these two plates (A and C) with paraffine or other suitable substance which is insoluble in and otherwise unaffected by the liquid present. The paraffine is scraped off the surface or dissolved off with ether, in order that the plates may make good electrical connection to the liquid. The object of filling the pores of these plates in this way is to prevent the liquid from leaking out of the cell. The edges of the plate B are also filled in the same manner and for the same reason. The plates thus prepared are put together with washers or gaskets, as shown in Fig. 1. This arrangement of plates separated by ledges upon the plates or by gaskets has been shown and described by me in a previous application filed July 18, 1884, Serial No. 138,015, and I adopt that construction to illustrate my present invention. In the case just cited the porous plates employed were of the ordinary kind, being made of non-conducting material, such as unglazed earthenware. In this case the porous plates used are made of a conducting substance, such as carbon. The cell having been properly put together, as is more fully described in the application cited above, its two compartments are then filled with the electrolyte—in this case I assume it to be a solution of zinc bromide—and the plate A is connected to the negative pole of a dynamo-electric machine or other source of electrical energy, and the plate C is connected to the positive pole, and a current of electricity will pass through the cell, decomposing the zinc bromide and depositing zinc upon the cathode A and liberating bromine upon the anode C. The plate B acts merely as a porous plate to keep the bromine which collects in the space between the plates B and C from coming in contact with the zinc deposited upon the plate A. Porous plates are usually made of substances which are non-conductors of electricity, and it would appear that some difficulty might be introduced by having the plate B a conductor. In order to understand that no trouble will arise from this cause, it is necessary to consider carefully the conditions in the case. It is well known that when an electrolyte is decomposed by the action of an electric current an opposing or "counter" electro-motive force is set up, which is a constant quantity for each electrolyte, and if the direct or charging electro-motive force be lower than the counter electro-motive force no current will flow and no decomposition can occur. Hence it follows that while the cell described above is being charged the porous plate B will act precisely as if it were composed of a non-conducting substance—that is, the current will pass through the pores of the plate, being conducted by the solution which they contain; but no current will be carried by the substance of the plate itself, provided that the difference of potential between the opposite sides of said plate be less than the electro-motive force required to decompose zinc bromide, which is 1.78 volts. If, however, the difference of potential between the two surfaces of the porous plate B were above 1.78 volts, the plate would begin to act as a conductor, and zinc would be deposited upon one side and bromine set free upon the other, and the cell would be split into two couples, the porous plate B forming an intermediate electrode. The objection to this would be that there would be no separation between the zinc and bromine. Now it is certain that in practice the difference of potential between the surfaces of the plate B will be far below this limit of 1.78 volts, for it would not be permissible to have in charging the cell a loss of more than twenty-five per cent.—that is to say, the fall of potential in the battery due to resistance must not be greater than one-quarter of the total fall in the battery—and since the remaining three-quarters of the total fall is due to counter electro-motive force the fall due to resistance is one-third of the counter electro-motive force, but the resistance between the two surfaces of the porous plate is only a portion of the resistance of the cell, probably about one-half; consequently the difference of potential between these surfaces would be about one-sixth of the counter electro-motive force, or one-sixth of 1.78 volts. Thus we see that there is no danger of any electrolytic action upon said porous plate, and it is obvious that with a difference of potential between its surfaces of only one-sixth that required to decompose the electrolyte said plate will act just as if it were made of non-conducting material, merely conducting the current by the solution contained in its pores. We have seen that in charging the cell the two plates A and C are the electrodes of the cell, as shown in Fig. 1, and the porous plate B performs no electrical function. It merely acts mechanically to prevent the bromine liberated upon the plate C from coming in contact with zinc deposited upon the plate A; but in the discharge of the cell electrical connection is made to the plate B by a switch or other suitable means, as shown in Fig. 2, and it is employed as the negative electrode together with the plate C, the plate A, coated with zinc, being, of course, the positive electrode. The advantage of using the plate B as the negative electrode in discharging, instead of the plate C, is that the internal resistance of the cell is thereby reduced, since it is virtually the same as bringing the two electrodes nearer together. The bromine which collects in charging in the space between the two plates B and C is taken up by the plate B in discharging as well as it would be by the plate C.

In making electrical connection to the carbon plates I have made use of several methods. One which I have found to answer very well (shown in Figs. 1 and 2) consists in electroplating the edges with copper and then a piece of copper wire is soldered to this rim of copper. Another plan is to electroplate a wire fast to the edge of the carbon plate, said wire passing entirely around the plate. The individual cells may be connected together in various ways to form batteries.

Figs. 3 and 4 are diagrams representing a number of cells arranged in series. This battery in general form is similar to the battery described by me in the application which I have already cited, (filed July 18, 1884, Serial No. 138,015,) but differs from that battery, as I have hereinbefore pointed out, in having carbon plates instead of earthenware; but in charging the action of the two kinds of plates is the same. The current from a dynamo or other electrical generator enters the battery by the wire D and passes directly through and out at the other end by the wire E, as shown in Fig. 3. The battery consists entirely of carbon plates, every other plate having its pores filled with paraffine, the alternate ones being left porous. The non-porous plates act as the electrodes, since the current must pass through the plates themselves, being conducted by the carbon of which they are composed, and upon these plates zinc will be deposited on one side and bromine set free upon the other; whereas in the case of the porous plates the current will pass through the pores, being carried by the solution which fills them, as explained above. After the battery has been charged it is discharged by connecting the plates B and C together in each cell, as shown in Fig. 4, the advantage being, as explained above, in the case of the single cell shown in Fig. 2, that the internal resistance of the battery is reduced, since the resistance of the liquid between the plates B and C is eliminated, the resistance of the carbon plates and copper wire for connecting them being of course much less than that of the liquid. It is not at all essential to connect the plates B and C together in discharging the battery. The battery can be discharged precisely as it is charged, if desired; but of course it is always desirable to lower the internal resistance as far as possible.

Fig. 5 shows a number of cells arranged in multiple arc. The plates marked A are all connected together. In charging they are connected to the negative pole of electrical generator, and upon them zinc is deposited. The plates marked C are also connected together and to the positive pole of the generator, and upon these plates bromine is set free. With the exception of the two end plates, zinc is deposited upon both sides of the plates A A A and bromine upon both sides of the plates C C C. The two end plates of course only act on one side. It will be seen in the drawings, Fig. 5, that in every case there is a plate B between each pair of electrodes A and C. The plates B are porous. The plates A and C may be filled with paraffine, if desired; but it is not necessary. In discharging the battery the set of plates B is employed as the negative electrode instead of the set C; or, if desired, the two sets B and C may be connected together and used as the negative electrode.

It is obvious that my invention is applicable to any form of secondary battery in which there are porous diaphragms or cells.

Having now described my invention, what I claim, and desire to secure by Letters Patent, is—

1. In a secondary battery, a porous plate, cell, or diaphragm composed of some suitable conducting material, which serves as a partition to separate the liquids while the battery is being charged, and means for connecting said plate or diaphragm to the working-circuit as an electrode in discharging, substantially as described.

2. In a secondary battery, porous carbon plates or diaphragms which serve as partitions to separate the liquids in charging, and means for connecting said diaphragms to the working-circuit as electrodes in discharging, substantially as described.

3. A secondary battery provided with a series of plates or diaphragms of non-porous conducting material and of porous conducting material placed alternately, said non-porous plates constituting the partitions which separate the cells, and serving also as electrodes, and said porous plates serving in charging as partitions to separate the liquids, and means for connecting said porous plates as electrodes to the working-circuit in discharging, substantially as described.

4. In a secondary electric battery, the combination of porous plates, diaphragms, or cells composed of some suitable material which is a conductor of electricity, which act to keep apart the fluids of the battery, and a switch or switches whereby said plates, diaphragms, or cells may be electrically disconnected from the circuit while the battery is being charged and connected to the circuit while the battery is being discharged, substantially as described.

Signed and witnessed this 9th day of August, 1884.

CHARLES S. BRADLEY.

Witnesses:
FRANCIS B. CROCKER,
CHARLES G. CURTIS.